United States Patent Office 2,801,209
Patented July 30, 1957

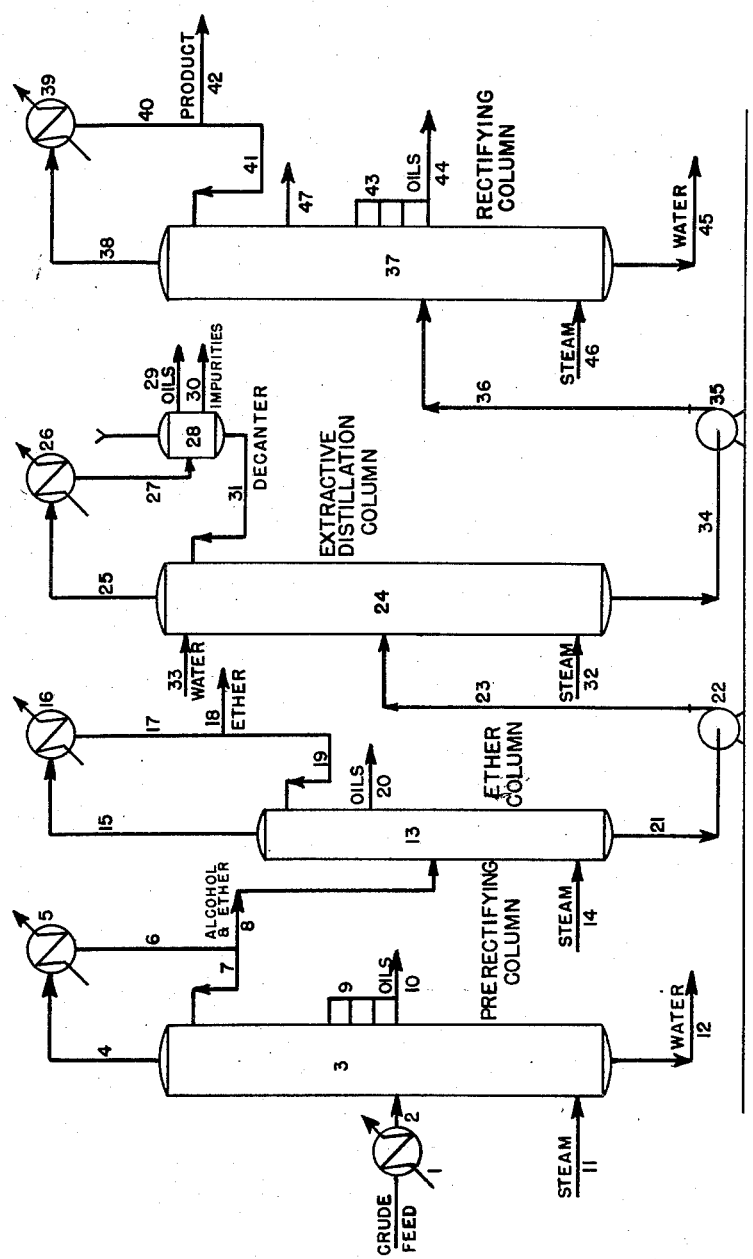

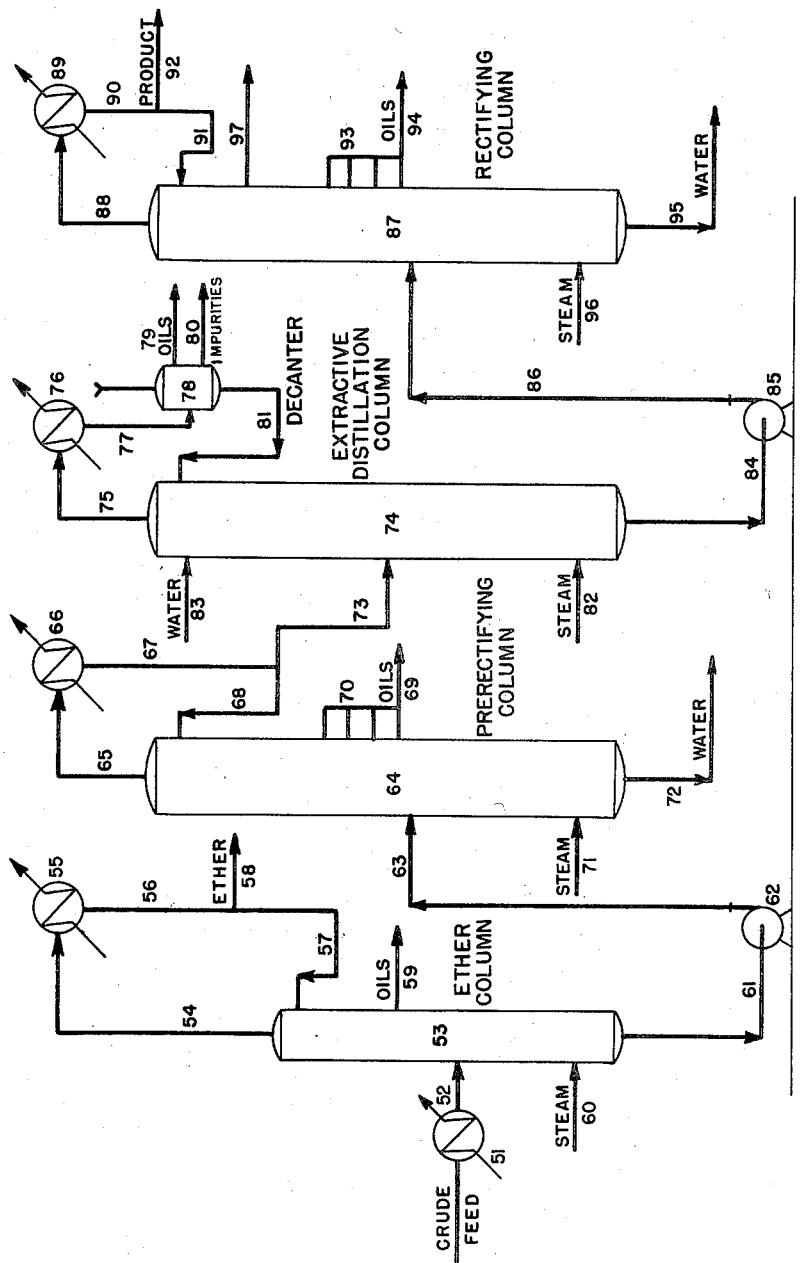

2,801,209

ALCOHOL PURIFICATION PROCESS

Werner C. Muller, Roslyn, N. Y., and John J. Hawkins, Champaign, Ill., assignors to National-Petro Chemicals Corporation, New York, N. Y., a corporation of Delaware Application November 16, 1954, Serial No. 469,205

2 Claims. (Cl. 202—39.5)

This invention relates generally to a novel, commercial process for the refining and purification of crude aliphatic alcohols produced by the hydration of mono-olefins. More specifically, this invention relates to a process whereby an impure alcohol produced by the hydration of mono-olefins is conveniently processed to remove in one integrated operation, impurities boiling below the boiling point of the alcohol being purified, impurities boiling in the same range as the alcohol, and impurities boiling considerably above the alcohol. The process is of special importance since it substantially completely removes unstable impurities which tend to undergo thermal decomposition during normal distillation operations and thus avoids the formation of volatile, malodorous impurities boiling below the alcohol.

This invention provides an effective process in which both water-soluble and water-insoluble impurities, including particularly odor-producing and potential odor-producing contaminants, are removed from alcohols produced by the hydration of olefins. The process of this invention is especially useful for the production of high quality, substantially odorless aliphatic alcohols, particularly ethanol.

Further, this invention provides an improved process for the refining and purification of crude ethanol obtained by the catalyzed hydration of ethylene in which the crude ethanol is subjected to a prerectification in which the major portion of the high boiling impurities particularly those which are thermally unstable and which undergo decomposition and degradation upon heating and thus produce malodorous products boiling below ethanol are separated from the ethanol containing stream. The preliminary rectification of the dilute alcohol removes higher boiling impurities which cannot be completely removed by water extractive distillation. A preliminary distillation is also preferable to remove, as an overhead stream, the lower boiling impurities and particularly diethyl ether. Remaining higher boiling impurities are subsequently separated by a water extractive distillation of the partially purified aqueous alcohol. Following the water extractive distillation step, the purified dilute aqueous alcohol is subjected to a final rectification from which concentrated alcohol is recovered. This ethanol is of highest quality, entirely free from malodorous, volatile contaminants. More specific details and features of the invention will become apparent from the description given below.

By the catalyzed hydration of olefins is meant those processes in which the mono-olefins are hydrated in the presence of a catalyst, including both the acid catalyzed processes wherein mono-olefins and mixtures thereof are hydrated in the presence of polybasic acid-acting mineral acids such as sulfuric acid, phosphoric acid, and benzenesulfonic acid, and those processes, of the direct hydration type, in which the olefin is hydrated in the presence of solid catalysts such as phosphoric acid, phosphoric acid-tungsten oxide and the like. The most common commercial process is one in which ethylene is absorbed in strong sulfuric acid to yield an absorbate containing monoethyl sulfate and diethyl sulfate esters. Said absorbate is diluted and hydrolyzed, and a crude aqueous ethanol mixture is separated therefrom.

Operating according to the process of this invention, excellent yields of highest quality purified alcohol can be produced for use in industries requiring odor-free solvents. These include extensive uses in the cosmetic, perfume, drug, biological and vitamin industries.

It is well known that alcohols produced by the above outlined methods, and especially those produced by the sulfuric acid hydration of olefins, possess to a more or less degree, a distinct and foreign odor, slightly penetrating and for the most part disagreeable. Although it is not intended to ascribe the disagreeable odor of these alcohols to the presence of any one or to any particular combination of chemical compounds, it is definitely known that the odors of the crude alcohols depend largely on the quality of the starting material, that is, the purity of the olefin stream employed in the olefin hydration operation. Likewise, the odor of a refined alcohol depends to a similar extent on the quality of the crude alcohol from which it is originally prepared. Thus, a rather wide range of variations in purity and odor characteristics is possible for synthetic ethanol products.

Olefin hydrocarbons, such as those produced by the cracking of mineral oils, fuel oils, kerosenes, petroleum residues, hydrocarbon gases, and the like, contain variable amounts of compounds having an obnoxious odor, particularly compounds containing chemically bound sulfur such as hydrogen sulfide, alkyl sulfides, mercaptans, etc. These materials, even when present as traces in the olefinic stream fed to the acid hydration process, contribute heavily to the obnoxious odor of the crude alcohol. Although pure elemental sulfur itself has no odor, when it is present in combination with other elements, it produces powerful odoriferous agents. The bad odor of alcohols has also been at least partially attributed to the presence of the so-called polymer products of wide boiling range which are formed by side reactions during the acid catalyzed olefin hydration process. The odor of these polymerized products is further accentuated by the presence of any sulfur compounds contained therein, although the odor of some pure polymers is, by itself, somewhat unpleasant. It has been further demonstrated that obnoxious odors in some hydration alcohols can be directly attributed to the decomposition of these polymeric materials during subsequent distillation operations. It is also possible that the presence of traces of nitrogen compounds contribute to the odor of the crude alcohols.

In order to show the number and diversity of the impurities usually present in alcohols produced by catalyzed hydration processes, the following analysis is presented. This analysis was made on a sample of crude ethanol produced by the sulfuric acid hydration of ethylene, the proportions given being based on an anhydrous alcohol basis.

|  | Weight percent |
|---|---|
| Ethanol | 88.0. |
| Ether | 11.25. |
| Ketones | Trace. |
| Hydrocarbons | 0.45. |
| Higher alcohols | Trace. |
| Sulfur compounds | 3 p. p. m. as sulfur. |
| Polymer materials | 0.30. |

A typical ASTM standard distillation of a sample of the polymer materials fraction, resulting from the production of ethanol by the sulfuric acid hydration of ethylene, is as follows:

|  | Temp. °F. |
|---|---|
| Initial boiling point | 211 |
| 5% | 412 |
| 10% | 419 |
| 20% | 428 |
| 30% | 435 |
| 40% | 441 |
| 50% | 450 |
| 60% | 459 |
| 70% | 469 |
| 80% | 490 |
| 90% | 512 |
| 95% | 545 |
| End point recovery—96% | 558 |

Thus, regardless of exact causes, it has been found that the crude ethanol produced by the sulfuric acid hydration of ethylene contains impurities which are peculiar to products from the hydration process, including water, ethers, ketones, other higher alcohols, hydrocarbons, sulfur and nitrogen compounds, and various polymer oils having more or less complex chemical structures.

Until recently, commercial crude aqueous ethanol resulting from the acid hydration of ethylene was purified by the general method outlined below. The crude aqueous alcohol was diluted with additional water in an attempt to throw out of solution a portion of the water insoluble impurities. Any resulting layer of insoluble impurities was separated. The remaining aqueous alcohol was then subjected to a distillation in a rectification column, wherein some of the low boiling impurities, including the major portion of the ethers, and some of the light hydrocarbons were removed overhead. The aqueous alcohol bottoms fraction from this rectification column was sent to a second rectification column from which various fractions were removed either overhead or as side streams. For example, a cut containing heavy polymer oils, ethanol, and water was removed at a point somewhat below the feed plate; another cut containing lighter polymer oils, ethanol, and water was removed at a point above the feed plate; an overhead cut containing volatile impurities and polymer decomposition products was removed from the top of the tower, while the product alcohol itself was recovered as a side stream removed at a point a few plates from the top of the tower. This type of purification operation has been shown to give unsatisfactory alcohol. It consistently gives final ethanol fractions having bad odor characteristics of more or less intensity depending on the composition and properties of the starting alcohol fraction.

More recently, it has been further suggested that the crude aqueous alcohol mixture containing the impurities as above described can be subjected to an improved operation in which the crude aqueous ethanol fraction is fed to a water extractive distillation tower at an intermediate point, and in which controlled amounts of water are fed to the top of the tower or at a point near the top in sufficient quantity to reduce the concentration of ethanol in the internal liquid reflux to 2 to 60 weight percent. At these dilutions the volatility of the water insoluble impurities including ethers, ketones, higher alcohols, low molecular weight hydrocarbons, and the higher boiling polymer oils is enhanced to facilitate their removal.

Hydration of ethylene using sulfuric acid produces diethyl ether as a by-product in quantities of from 3 to 15 weight percent based on the amount of ethanol produced. It has been found advantageous although not necessary to remove substantially all of this ether before the alcohol fraction is subjected to further treatment. In addition, the other above outlined impurities are present, particularly the malodorous polymer oils having relatively high boiling ranges up to 480–660° F. These higher boiling materials are difficult, if not impossible, to remove completely by extractive distillation even in the presence of large amounts of water and the most favorable operating conditions.

In a subsequent distillation operation, the dilute aqueous alcohol product recovered from the conventional purifying and refining operations but containing residual odoriferous impurities described above, is then ordinarily taken to a concentrating or rectifying column, wherein the alcohol is concentrated and recovered as an overhead fraction. It has been further found that the relatively high boiling impurities including particularly the polymer oils when introduced into the rectifying column even in small amounts, undergo thermal degradation and decomposition yielding low boiling polymer oils, sulfur containing materials, and partially oxygenated organic compounds. These lighter fractions have lower molecular weights and/or boiling ranges since they generally consist of fragments of heavier fractions. Because of these characteristics, they are readily carried over into the alcohol overhead fraction and are thus present in the finished, refined alcohol. Such impure alcohol has an obviously unpleasant odor and purified alcohol of desired odor characteristics cannot be thus obtained as a fraction from the upper portion of the rectifying column.

A sample of a fraction of oil recovered as a side stream from a rectifying column was studied to determine its behaviour on heating both alone and in the presence of alcohol and water under thermal conditions typical of those normally existing in the rectifying zone wherein concentration is effected. A sample of polymer oil containing 350 p. p. m. of sulfur was added to refined alcohol and refluxed in a laboratory distillation column (180–200° F.—atm. pressure). A sample of alcohol drawn from the overhead shortly after refluxing was begun showed only a slight malodorous content. A sample of overhead drawn after 24 hours of refluxing was extremely malodorous and exhibited a sulfurous characteristic. The residual oil recovered from the charge was analyzed and showed only 285 p. p. m. of sulfur. This is clear evidence that substantial portions of the sulfur containing oil decomposed during the period of refluxing and that this decomposed, volatile material carried relatively large amounts of sulfur and malodorous impurities into the volatile overhead fraction.

A sample of polymer oil containing 350 p. p. m. of sulfur was distilled to dryness under vacuum (0.4 mm.) and yielded the following fractions at temperatures of from 175° to 225° F.:

| Fraction No. | Weight, gm. | Sulfur, p. p. m. |
|---|---|---|
| Cold trap | 2.6 | 722 |
| No. 1 | 6 | 210 |
| No. 2 | 12.8 | 154 |
| No. 3 | 14.3 | 144 |
| No. 4 | 4.2 | 526 |
| Residue | 1.6 | |

Thus the volatile decomposition product collected in a Dry Ice cold trap located on the condenser vent contained the greatest concentration of sulfur. Although appreciable concentrations of sulfur were found in all fractions, the greatest amount, 722 p. p. m. sulfur found in the cold trap fraction represents volatile impurities produced by the thermal decomposition of the heavy sulfur containing polymer oils during the distillation. Such thermal decomposition causes the high sulfur content of the cold trap fraction, all of which is volatile and passes overhead with ethanol during distillation.

The high boiling thermally unstable polymer oils which are subject to decomposition during distillation operations are relatively non-volatile from high strength ethanol and can be best removed by rectification of the alcohol to high strength and refluxing the high boiling oils to the lower portion of the rectification zone. It is essential that the rectification to high strength for removal of the thermally unstable oils be performed during early purifying steps in order to permit complete removal of any malodorous volatile decomposition products, formed during this rectification, during subsequent purification steps.

According to the improvements comprising this invention, a crude aqueous alcohol mixture containing from 0.1 to 2.0 weight percent polymer oils, is used as the original feed stream. This synthetic ethanol stream is produced by the hydration of an ethylene containing stream with sulfuric acid. In addition, from 3 to 15 percent by weight of diethyl ether may be present, depending on whether or not the crude ethanol has previously been treated for removal of volatiles, including particularly, the diethyl ether. The crude alcohol mixture also contains varying amounts of water, for instance, from 12 to 60 percent by weight.

The crude aqueous ethanol containing stream which also contains substantial amounts of higher boiling impurities including unstable polymeric oils which are decomposable, is subjected to a preliminary rectification. Alternatively the crude ethanol feed to this preliminary rectification zone can be supplied as a vapor phase stream which is passed directly from previous processing steps such as the overhead stream from a stripping column as normally used to recover crude ethanol from synthesis operations. For instance, in well-known industrial synthesis operations an ethylene containing stream is passed into strong sulfuric acid which absorbs the ethylene to form an absorbate which is a mixture of monoethyl sulfate and diethyl sulfate esters. This absorbate is diluted and hydrolyzed, and the crude ethanol containing mixture is separated therefrom by stripping.

This preliminary rectification is conducted in the rectification zone of a fractional distillation column having from 40 to 60 plates. The temperatures within the column are controlled such that the more volatile materials, that is, components boiling up to and including essentially all the ethanol are recovered as a fraction from the upper portion of the column. This means that the temperature at the bottom of the column ranges from 212° to 220° F. and is preferably controlled to the boiling point of pure water at the operating pressure. At the top of the column, the temperature ranges from about 170° to 180° F. The fraction removed from the upper portion will thus contain substantially all of the ethanol, all of the diethyl ether and other volatile impurities if they have not been previously removed, and some water along with a small portion of the more volatile higher boiling impurities. Concentration of ethanol in the fraction removed should be controlled to 85 to 95 percent, and preferably 90 to 95 percent, by weight. This stream is substantially free of the higher boiling impurities which are subject to thermal degradation and decomposition during final rectification operations. These impurities together with some other impurities boiling nearer to ethanol, along with some water and residual amounts of ethanol are separated from a lower portion of the rectification zone. In this way, the ethanol containing stream is separated essentially completely from the impurities which tend to undergo thermal decomposition to more volatile impurities during final rectification operations. Thus, there are no impurities more volatile than ethanol present in the purified ethanol after the final concentration step.

If ether is present in substantial amounts, it is preferably removed during the preliminary stages of the purification operations. Thus an ether removal column may be employed either before or after the pre-rectification column. The use of such an ether column constitutes an additional feature of the more specific embodiments of the invention. If an ether removal column is employed, the alcohol containing stream is fed into a distillation tower. This distillation tower is operated at a superatmospheric pressure of 5 to 20 p. s. i. g. to facilitate condensation of ether. The temperature within the column is controlled such that the temperature at the top of the column is between 120° to 140° F., and at the bottom, between 200° and 220° F. The vapor stream from the upper portion of this ether removal column has the approximate composition of 98 weight percent ether, 1.5 weight percent water, together with traces of acetaldehyde and other low boiling impurities. This overhead fraction is condensed, and at least a portion removed as crude diethyl ether for further purification.

The crude aqueous alcohol stream which is relatively free of ether, and free of thermally unstable, polymeric oils which decompose during final rectification operations, and which is obtained as a result of these preliminary refining operations is then subjected to a water extractive distillation operation.

The aqueous alcohol mixture is then subjected to a water extractive distillation step. The ethanol containing mixture is fed to an intermediate point of a rectification tower. Sufficient water is added at the top of the tower, or at a point above the feed plate to reduce the concentration of ethanol in the internal reflux to 5 to 40 weight percent and preferably to 10 to 30 weight percent. The water present in the extractive distillation raises the active boiling temperature on the trays and causes the passage upward in the column of the volatile organic impurities remaining in the alcohol. There is consequently produced as a bottoms stream an aqueous ethanol stream containing from 3 to 20 weight percent alcohol which is entirely free of malodorous impurities and also free of higher boiling materials which might undergo thermal degradation during subsequent concentration of the dilute alcohol.

For example, an aqueous bottoms stream of the following general composition has been obtained using the above outlined purification steps.

EXTRACTIVE DISTILLATION COLUMN BOTTOMS

Ethanol _____ 3.0 to 15.0 weight percent.
Polymer oils_____ Less than 0.002 weight percent.
Water _____ Remainder.

This weak alcohol fraction is next subjected to concentration in a rectifying column. The temperature within the column will range from about 220° F. at the base to about 175° F. at the top of the column. Since essentially all the malodorous impurities and all of the higher boiling materials which otherwise, if present, undergo decomposition and degradation to lower boiling, more volatile materials have been previously removed, a pure 95 percent alcohol stream is recovered as an overhead fraction or preferably as a top side stream from the rectifying column. Any undecomposed heavy oils which may accumulate at or near the feed plate of the rectifying column can be withdrawn from suitable side connections for further processing.

The concentrated alcohol stream thus recovered is of highest quality and requires no further refining or purification treatments. It shows the following typical analyses:

|  | Sample I | Sample II |
|---|---|---|
| Specific Gravity | 0.8118 | 0.8114. |
| Acidity, percent | 0.001 | 0.001. |
| Clarity on Dilution | clear | clear. |
| Color, APHA | <5 | <5. |
| Proof | 192.0 | 192.2. |
| Methanol | <200 p. p. m. | <200 p. p. m. |
| Non-volatile matter, percent | .001 | .001. |
| Permanganate Time | >60 | >60. |
| Solubility | good | good. |
| Isopropanol | <100 | <100. |
| Odor | no detectable foreign odor. | no detectable foreign odor. |

*Example I*

The accompanying Figure 1 represents a flow plan in elevation of the process and shows typical apparatus for carrying out the process of this invention.

The approximate composition of the crude ethanol feed which is fed to the purification system is as follows:

| | Percent |
|---|---|
| Ether | 3–15 |
| Oil | 0.1–2.0 |
| Alcohol | 40–70 |
| Water | 56.9–13 |

The ether may or may not be present in the crude feed to the purification system. If it has previously been removed, then the ether removal column may be omitted.

The crude feed is heated to about 200° F. in preheater 1 and fed as a liquid continuously through pipe 2 to column 3 a rectifying column of approximately 40–60 trays. Alternatively, the crude feed may be introduced in the vapor phase directly from previous processing. The feed plate is preferably located at approximately the midpoint of the column. Heat is supplied to the base of column 3 by live steam line 11 or, alternatively, by a closed steam coil. Vapors from column 3 consisting of alcohol, ether and volatile impurities, including voltatile oils are withdrawn overhead and passed via line 4 to condenser 5. The condensed mixture containing the major portion of the ethanol is withdrawn via line 6. A part of the condensate is returned via line 7 to column 3 as reflux. The remainder is withdrawn as a partially refined alcohol stream through line 8. Sufficient reflux is returned to the top of 3 to maintain an ethanol concentration of 85 to 95 weight percent and preferably 90 to 95 weight percent of the ethanol plus water content. At this concentration of alcohol in the upper zone of column 3, heavy polymer oils accumulate in the vicinity of the feed tray and are withdrawn through pipes 9 and into line 10 for removal to further processing. The bottoms from column 3 consisting substantially of water, are withdrawn via line 12. Stream 8 is fed continuously into an intermediate point of ether removal column 13, a rectifying column of approximately 40 trays. Heat is supplied to the base of column 13 by live steam line 14 or, alternatively, by a closed steam coil and continuous fractional distillation of the crude ethanol feed is thereby effected. Column 13 is operated under 5 to 30 p. s. i. g. pressure to facilitate condensation of ether vapor. The temperature at the bottom of column 13 is maintained at about 200–220° F. Vapor boiling overhead from column 13 is removed through overhead line 15. The temperature at the top of column 13 is about 125–130° F. The vapor in line 15 is passed to condenser 16. The condensate from condenser 16, predominately diethyl ether with some volatile impurities including low boiling polymer oils and water, is removed via line 17. A major part of this stream is returned via line 19 to provide refluxing liquid for column 13. The remaining portion is withdrawn by line 18 as crude diethyl ether product which may be further purified and refined as desired.

Some of the polymer oil impurities present in the crude ethanol feed, particularly those which are more volatile than ethanol, may accumulate in column 13 at a point near or slightly above the feed point. These impurities are withdrawn from column 13 via line 20. Dilute ethanol stripped of its more volatile impurities, particularly the predominant impurity diethyl ether as well as a small amount of polymer oils, is withdrawn from the base of column 13 through line 21.

The aqueous ethanol stream containing essentially all of the ethanol which is withdrawn through line 21 is passed to pump 22 which discharges through line 23 to extractive distillation column 24. This column is preferably a distillation tower of about 45 plates and feed line 23 is positioned at or slightly above the midpoint. Dilution water is introduced into column 24 via line 33 at a point above the feed point, either at or near the top. Continuous extractive distillation is conducted in column 24. The water is introduced in such amounts to effect dilution and to modify and increase the volatilities of the organic compounds, particularly the remaining polymer oil impurities such that they can be readily removed from the alcohol by distillation. This water may be pure water or it can be an aqueous stream which is recycled from the bottom of the alcohol rectification column.

The feed to column 24 is preferably preheated prior to introduction to a temperature at or near that of the internal liquid reflux under equilibrium conditions of the tray located at the introduction position. The column is operated with continuous introduction of alcohol feed, continuous introduction of water above the feed, and with sufficient heat provided to effect distillation throughout the column. The amount of water added is sufficient to reduce the ethanol concentration to 10 to 40 weight percent, and preferably 15 to 30 weight percent in the internal reflux. Operating thus, the purified aqueous ethanol fraction recovered as the bottoms stream is dissolved in and carried downward in the aqueous internal reflux. Steam is introduced into the base of column 24 through line 32 or, alternatively, heat may be supplied to column 24 by means of a closed heating coil. Overhead vapors boiling from column 24 are carried by line 25 to condenser 26. Condensed vapors are removed from condenser 26 by line 27 and passed to decanter 28.

Any lighter oil impurities which are fed into column 24 are removed in the overhead stream via line 25 and passed to condenser 26. The resulting condensate is then passed to decanter 28. By using sufficient dilution water in column 24, oil impurities distilled from column 24 form an upper oil phase in decanter 28 and are withdrawn through line 29 for further treatment. The lower aqueous phase from 28 is returned to column 24 as reflux through line 31, or alternatively, may be partially or totally withdrawn through line 30 as an overhead aqueous stream to remove any water soluble impurities present.

Bottoms product stream from column 24 containing the predominant part of the original ethanol in dilute aqueous solution of about 10 to 40 weight percent and essentially free of all of its original impurities is withdrawn via line 34. From line 34 it is passed to pump 35 discharging through line 36 to rectifying column 37 having 60–70 trays. Heat is supplied to the base of column 37 through steam line 46 or alternatively it is supplied through a closed heating coil or by means of a reboiler. In column 37, the purified aqueous alcohol is concentrated to the required proof. Vapors boiling overhead from column 37 which consist of highly refined ethanol are passed by line 38 to condenser 39. The top temperature of the column is about 175° F. Condensed purified ethanol is withdrawn from condenser 39 through line 40. A part of the condensate is refluxed to the top of column 37 through line 41. Highly refined product alcohol having no detectable foreign odor is withdrawn through line 42 or, alternatively, the product is withdrawn as a side stream via line 47 from a point near the top of column 37, to prevent contamination of the product alcohol during periods of improper operation. When so operating, a small stream is withdrawn from condenser 39 through lines 40 and 42 and recycled to extractive distillation column 24.

Any heavy oils which are not wholly removed through pipes 9 and 10 as side streams from column 3 may accumulate at or near the feed tray of column 37 and are withdrawn through side connections 43 and pipe 44 for further processing. Water substantially free of alcohol is withdrawn from the base of column 37 through line 45.

The aqueous bottoms stream from column 37 can also, if desired be partially or totally recycled to extractive distillation column 24 and added thereto via line 33 to serve as a dilution stream.

The purified ethanol obtained thusly has been subjected to analysis by distillation and the fractions carefully examined for odor characteristics. The data show that it is entirely free from any detectable odor and otherwise is highest quality, purified ethanol.

Example II

The accompanying drawing, Figure 2, represents a schematic diagram showing an alternate plan for carrying out the process.

The approximate composition of the crude ethanol feed is the same as that described for the feed stream in Example I.

The crude feed is heated to about 200° F. in preheater 1 and fed continuously into an intermediate point of ether removal column 53, a rectifying column of approximately 40 trays. Heat is supplied to the base of column 53 by live steam line 60 or, alternatively, by a closed steam coil and continuous fractional distillation of the crude ethanol feed is thereby effected. Column 53 is generally operated at 5–30 p. s. i. g. pressure to facilitate condensation of the ether vapor. The temperature at the bottom of column 53 is maintained at about 200–220° F. Vapor boiling overhead from column 53 is removed through overhead line 54. The temperature at the top of column 53 is about 125–130° F. The vapor in line 54 is passed to condenser 55. The condensate from condenser 55 is predominately diethyl ether with some volatile impurities including low boiling polymer oils and water and a small amount of ethanol. This ether stream is removed via line 56. A major part of this stream is returned via line 57 to provide refluxing liquid for column 53. The remaining portion is withdrawn by line 58 as crude diethyl ether product which may be further purified and refined as desired.

Some of the polymer oil impurities present in the crude ethanol feed, particularly those which are more volatile than ethanol in the presence of aqueous ethanol solution, may accumulate in column 53 as a non-aqueous phase at a point near or slightly above the feed point. These impurities are withdrawn from column 53 via line 59. Dilute ethanol stripped of its more volatile impurities, particularly the predominant impurity diethyl ether is withdrawn from the base of column 53 through line 61.

The aqueous ethanol stream withdrawn through line 61 and containing essentially all of the ethanol is passed to pump 62 which discharges through line 61. The stream in line 63 is fed continuously to column 64, a rectifying column of approximately 40 to 60 trays. The feed plate is preferably located at approximately the midpoint of column 64. Heat is supplied to the base of column 64 by live steam line 71 or, alternatively, by a closed steam coil. Vapors from column 64 consisting of alcohol, and volatile impurities, including some volatile oils are withdrawn overhead and passed via line 65 to condenser 66. The condensed mixture containing the major portion of the ethanol is withdrawn via line 67. A part of the condensate is returned via line 68 to column 64 as reflux. The remainder is withdrawn as a partially refined alcohol stream through line 73. Sufficient reflux is returned to the top of column 64 to maintain an ethanol concentration of 85 to 95 weight percent and preferably 90 to 95 weight percent in the overhead fraction. At this concentration of alcohol in the upper zone of column 64, heavy polymer oils accumulate at or near the feed point and are withdrawn through pipe 70 and line 69 for further processing. The bottoms fraction from column 64 consisting substantially of water is withdrawn via line 72. The partially refined alcohol stream is passed via line 73 into extractive distillation column 74. This column is preferably a distillation tower of about 45 plates and feed line 73 is positioned at or slightly above the midpoint. Dilution water is introduced into column 74 via line 83 at a point above the feed point, either at or near the top. Continuous extractive distillation is conducted in column 74. The water is introduced in such amounts to effect dilution and to modify and increase the volatilities of the organic compounds, particularly the remaining polymer oil impurities such that they can be readily removed from the alcohol by distillation. This water may be pure water or it can be an aqueous stream which is recycled from the bottom of the alcohol rectification column.

The feed to column 74 is preferably preheated, prior to introduction, to a temperature at or near that of the internal liquid reflux under equilibrium conditions of the tray located at the introduction position. The column is operated with continuous introduction of alcohol feed, continuous introduction of water above the feed, and with sufficient heat provided to effect distillation throughout the column. The amount of water added is sufficient to reduce the ethanol concentration to 10 to 40 weight percent, and preferably 15 to 30 weight percent in the internal reflux. Operating thus, the purified aqueous ethanol fraction recovered as the bottoms stream is dissolved in and carried downward in the aqueous internal reflux. Steam is introduced into the base of column 74 through line 82 or, alternatively, heat may be supplied to column 74 by means of a closed heating coil. Overhead vapors boiling from column 74 are carried by line 75 to condenser 76. Condensed vapors are removed from condenser 76 by line 77 and passed to decanter 78.

Any lighter oil impurities which are fed into column 74 are removed in the overhead stream via line 75 and passed to condenser 76. The resulting condensate is then passed to decanter 78. By using sufficient dilution water in column 74, oil impurities distilled from column 74 form an upper oil phase in decanter 78 and are withdrawn through line 79 for further treatment. The lower aqueous phase from 78 is returned to column 74 as reflux through line 81 or, alternatively, may be partially or totally withdrawn through line 80 as an overhead aqueous stream to remove any water soluble impurities present.

Bottoms product stream from column 74 containing the predominant part of the original ethanol in dilute aqueous solution of about 5 to 30 weight percent and essentially free of all of its original impurities is withdrawn via line 84. This dilute ethanol stream is entirely free of the thermally unstable impurities and can be subjected to concentration by rectification without formation of decomposition products. Bottoms stream 84 is passed to pump 85 discharging through line 86 to rectifying column 87 having 60–70 trays. Heat is supplied to the base of column 87 through steam line 96 or alternatively it is supplied through a closed heating coil or by means of a reboiler. In column 87, the purified aqueous alcohol is concentrated to the required proof. Vapors boiling overhead from column 87 which consist of highly refined ethanol are passed by line 88 to condenser 89. The top temperature of the column is about 180° F. Condensed purified ethanol is withdrawn from condenser 89 through line 90. A part of the condensate is refluxed to the top of column 87 through line 91. Highly refined product alcohol having no detectable foreign odor is withdrawn through line 92 or, alternatively, the product is withdrawn via line 97 as a side stream from a point near the top of column 87, to prevent contamination of the product alcohol during periods of improper operation. When so operating, a small stream is withdrawn from condenser 89 through lines 90 and 92 and recycled to extractive distillation column 74.

Any heavy oils which are not wholly removed through pipes 79 and 60 as side streams from column 64 may accumulate above the feed tray of column 87 and are withdrawn at or slightly above the feed plate through side connections 93 and pipe 94 for further processing. Water substantially free of alcohol is withdrawn from the base of column 87 through line 95.

This aqueous bottoms stream may also, if desired, be partially or totally recycled to extractive distillation column 74 and added via line 83.

The purified ethanol obtained thusly has been subjected to analysis by distillation and the fractions carefully examined for odor characteristics. These data show that the alcohol is of highest quality and entirely odor free.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. In a method for purifying and refining crude aqueous ethanol produced by the hydration of an ethylene containing stream, said crude ethanol containing both lower boiling impurities, including diethyl ether, and higher boiling impurities, including unstable polymeric oils which undergo decomposition under distillation conditions, which comprises the steps of continuously passing said crude aqueous ethanol into a fractional extractive distillation zone, continuously feeding water into said fractional extractive distillation zone at a point above the aqueous ethanol feed stream, maintaining an internal liquid reflux having an ethanol content of 5 to 40 weight percent within the zone below the water feed point, continuously removing from the upper portion of said extractive distillation zone, a stream containing organic impurities including both lower and higher boiling materials, continuously removing from the lower portion of said extractive distillation zone a dilute aqueous ethanol stream, passing said aqueous ethanol to a concentrating fractional distillation zone, and removing from an upper portion of said concentrating distillation zone a stream of concentrated ethanol, the improvement which comprises the steps of subjecting said crude ethanol containing stream to a preliminary fractional distillation by passing said stream into a fractional distillation zone, continuously removing from the upper portion of said fractional distillation zone, a stream containing substantially all of the ethanol at a concentration of 85 to 95 weight percent of total ethanol plus water, and relatively free of higher boiling unstable polymeric oils which undergo decomposition under final rectification conditions, passing said recovered ethanol stream to a second fractional distillation zone, removing from the upper portion of said second fractional distillation zone a stream containing lower boiling impurities including substantially all of the diethyl ether, removing from the lower portion of said second fractional distillation zone an ether-free aqueous ethanol stream, and then passing said ether-free ethanol stream into the above described fractional extractive distillation zone.

2. In a method for purifying and refining crude aqueous ethanol produced by the hydration of an ethylene containing stream, said crude ethanol containing both lower boiling impurities, including diethyl ether, and higher boiling impurities, including unstable polymeric oils which undergo decomposition under distillation conditions, which comprises the steps of continuously passing said crude aqueous ethanol into a fractional extractive distillation zone, continuously feeding water into said fractional extractive distillation zone at a point above the aqueous ethanol feed stream, maintaining an internal liquid reflux having an ethanol content of 5 to 40 weight percent within the zone below the water feed point, continuously removing from the upper portion of said extractive distillation zone, a stream containing organic impurities including both lower and higher boiling materials, continuously removing from the lower portion of said extractive distillation zone a dilute aqueous ethanol stream, passing said aqueous ethanol to a concentrating fractional distillation zone, and removing from an upper portion of said concentrating distillation zone a stream of concentrated ethanol, the improvement which comprises the steps of subjecting said crude ethanol containing stream to a fractional distillation zone, removing from the upper portion of said zone a stream containing lower boiling impurities including substantially all of the diethyl ether, removing from the lower portion of said zone an ether-free aqueous ethanol stream, continuously passing said aqueous ethanol stream into a second distillation zone continuously removing from the upper portion of said second distillation zone a stream containing substantially all of the ethanol at a concentration of 85 to 95 weight percent of total ethanol plus water, and relatively free of higher boiling unstable polymeric oils which tend to undergo thermal decomposition to volatilize malodorous impurities during final rectification operation, continuously removing from the lower portion of said second distillation zone a stream of higher boiling malodorous impurities and unstable polymeric oils, passing said aqueous ethanol stream into the above described fractional extractive distillation zone.

References Cited in the file of this patent

UNITED STATES PATENTS

| | | |
|---|---|---|
| 887,793 | Guillaume | May 19, 1908 |
| 2,350,256 | Shiras et al. | May 30, 1944 |
| 2,480,652 | Hillman et al. | Aug. 30, 1949 |
| 2,623,844 | Scheeline | Dec. 30, 1952 |
| 2,663,679 | Drout | Dec. 22, 1953 |

FOREIGN PATENTS

| | | |
|---|---|---|
| 1,006,439 | France | Sept. 8, 1950 |